United States Patent [19]

Mizuta

[11] Patent Number: 4,979,144

[45] Date of Patent: Dec. 18, 1990

[54] IC MEMORY CARD HAVING START ADDRESS LATCH AND MEMORY CAPACITY OUTPUT MEANS

[75] Inventor: Masaharu Mizuta, Itami, Japan

[73] Assignee: Mitsubishi Denki Kabushiki Kaisha, Japan

[21] Appl. No.: 284,714

[22] Filed: Dec. 14, 1988

[30] Foreign Application Priority Data

Jun. 20, 1988 [JP] Japan .................................. 63-150153

[51] Int. Cl.⁵ .............................................. G06F 12/02
[52] U.S. Cl. .................................. 364/900; 364/927.8; 364/929.4; 364/965; 364/965.8
[58] Field of Search .................. 364/200, 900; 235/380

[56] References Cited

U.S. PATENT DOCUMENTS 4,833,595 5/1989 Iijima ................................... 364/200

*Primary Examiner*—Raulfe B. Zache
*Attorney, Agent, or Firm*—Leydig, Voit & Mayer

[57] ABSTRACT

An IC memory card includes one or more memory devices for storing data, a memory latch for storing a start address set from outside of the card, a circuit for generating a signal representing the memory capacity of the card and for outputting the signal outside of the card, and a comparator for comparing the start address set in the memory latch with an address sent from an address bus and for making the data stored in the memory devices accessible from the outside of the card when upper bits of the two address are identical to each other. A computer system employing a plurality of such IC memory cards receives the memory capacities of the cards and assigns start addresses to the cards in sequence. Intervals between start addresses of cards adjacent in sequence are based on the memory capacities of the cards. Thus, a plurality of cards of varying memory capacities may make up a memory map having a continuous range of memory with no empty memory regions therein.

10 Claims, 7 Drawing Sheets

IC MEMORY CARD HAVING START ADDRESS LATCH AND MEMORY CAPACITY OUTPUT MEANS

BACKGROUND OF THE INVENTION

1. Field of the Invention

The present invention relates to an IC memory card incorporating an address decoding function.

2. Description of the Related Art

FIG. 1 is a block diagram of a conventional IC memory card which is described in "IC MEMORY CARD GUIDELINE" issued in, Sept. 1986 by the Personal Computer Business Committee of the Japan Electronic Industry Development Association. The IC memory card contains a memory chip portion 2 which generally comprises a plurality of RAM or ROM chips (see FIG. 2). An interface connector 1 which connects the IC memory card to an external circuit is connected to each of the memory chips in the memory chip portion 2 via a lower address bus 6 and a data bus 7. The interface connector 1 is connected to a chip selecting circuit 3 designed to select a specified memory chip in the memory chip portion 2 via a control bus 4 and an upper address bus 5. The control bus 4 further extends from the chip selecting circuit 3 to each of the memory chips in the memory chip portion 2. An upper address represents an address used to select a memory chip in the RAM memory chip portion 2, and a lower address represents an address within, each of the memory chips. Actually, some of the control lines directly extend from the interface connector 1 to the memory chip portion 2, as shown in FIG. 2. An external power supply line 8 indicated by Vcc, which is the voltage of power supplied from the outside of the IC memory card through the interface connector 1, and a ground line 9, indicated by GND, also extend from the interface connector 1 to the memory chip portion 2 and to the chip select circuit 3. FIG. 2 which concretely shows the IC memory card may be a 512 K bytes RAM card memory chip portion 2 includes sixteen 256 K bytes (32 K bits × 8 bits) SRAMs (Static Random Access Memories) 2-0 to 2-15. The chip select circuit 3 consists of, for example, a 74HC138. A card enable control line [CE]41 extends from the interface connector 1 (see FIG. 1) to the chip select circuit 3, and chip selection control lines [CS0 to CS15] 42 extend from the chip selecting circuit 3 to the individual SRAMs 2-0 to 2-15. The lower address bus 6, an output enable control line [OE]44, a write enable control line [WR] 45 and the data bus 7 respectively extend from the connector 1 to the individual SRAMs 2-0 to 2-15. An address signal which is applied to the chip select circuit 3 via the upper address bus 5 is a 4-bit signal consisting of upper address bits A15 to A18. An address signal which is applied to each of the memory chips via the lower address bus 6 consists of lower 15 address bits A0 to A14. Further, a data signal which is applied via the data bus 7 consists of 8 data $D_0$ to $D_7$. Since the RAM card shown in FIG. 2 contains sixteen SRAMs, and has an address length of 19 bits and a data length of 8 bits, it has a memory capacity of 512 K bytes. It is controlled in the same manner as that in which a usual RAM is controlled by the control signals on the card enable control line 41, the output enable control line 44, and the write enable control, line 45 when data is written in and read out from it, respectively.

In general, the IC memory card is connected to a computer system as a memory, as shown in FIG. 3. In FIG. 3, a computer system 10 which may be a personal computer has three 512 K byte IC memory cards, 103, 104, and 105. The IC memory cards 103, 104, and 105 are connected to a microprocessor 100 and a main memory 102 of the computer system via a system bus 101 and a connecting line 106 which includes the data bus, the address bus, and the control lines (not shown respectively) for the IC memory cards. An address decoding circuit 107 which is connected between the system bus 101 and the IC memory cards 103, 104, and 105 generates a card enable control signal for each of the IC memory cards 103 to 105 and supplies the generated signal to each of the cards via the corresponding card enable control line 41. A start address for each minimum memory area, each of the 512 K byte IC memory cards 103, 104, and 105 being a minimum memory area, is set up in the address decoding circuit 107. FIG. 4 shows a memory map made as a result of this start address setting. More specifically, memory capacity is extended for each boundary of 512 K bytes, i.e., for each IC memory card, which is treated as a unit, this unit being fixed. A RAM memory card is expensive and may have various capacities, for example, 32 K bytes, 64 K bytes, 128 k bytes, 256 K bytes, or 512 K bytes. In consequence, in FIG. 3 if the IC memory cards having 256 K bytes capacity are connected to the computer system 10 instead of the 512 K byte IC memory cards 104 and 105, setting of a start address by the conventional address decoding circuit 107 produces a memory map such as that shown in FIG. 5. Empty regions 104a and 105a are present in the memory map of the microprocessor 100, preventing the memory from being used efficiently. In other words, unless a means for changing the start address which is set in the address decoding circuit 107 for each IC memory card in accordance with the capacity of the IC memory card is provided separately, empty areas 104a and 105a occur on the memory map, preventing the memory map from being utilized effectively.

The conventional address decoding circuit provided in the computer system and the IC memory card connected thereto have the above-described relationship. Thus, if IC memory cards having various memory capacities are connected (or are provided), empty memory regions that are not used occur on the memory map of the microprocessor in the computer system, and the memory area cannot be used effectively.

SUMMARY OF THE INVENTION

Accordingly, an object of the present invention is to provide an IC memory card having an address decoding function which does not produce empty memory regions on the memory map of a computer system even if IC memory cards having various memory capacities are connected to the computer system and which enables the memory area to be used effectively. Another object of the present invention is to provide a computer system including the above IC memory card.

In order to achieve the above-described object, the present invention provides an IC memory card incorporating an IC memory chip portion, which comprises a memory means for storing data, having a memory capacity, means for outputting a memory capacity output signal representing the memory capacity, means for setting a start address including upper address bits for selecting the IC memory card and lower bits for addressing memory locations within the IC memory chip portion from outside of the card, and means for comparing the start address with an address having upper bits corresponding to the upper bits of the start address sent from an address bus and for making the data in the memory means accessible from the outside of the card when the upper bits of the two addresses are identical whereby a desired start address can be set from the outside of the card.

In the IC memory card according to the present invention, a desired start address can be assigned and be set in the IC memory card by the control effected by a card enable control line, a data bus, a write enable control line, and a latch enable control line In consequence, when such an IC memory card is connected to a computer system as an extended memory, the memory area of the IC memory card can be mapped at a desired position on the memory map in the computer system.

DESCRIPTION OF THE PREFERRED EMBODIMENT

Figure 1:
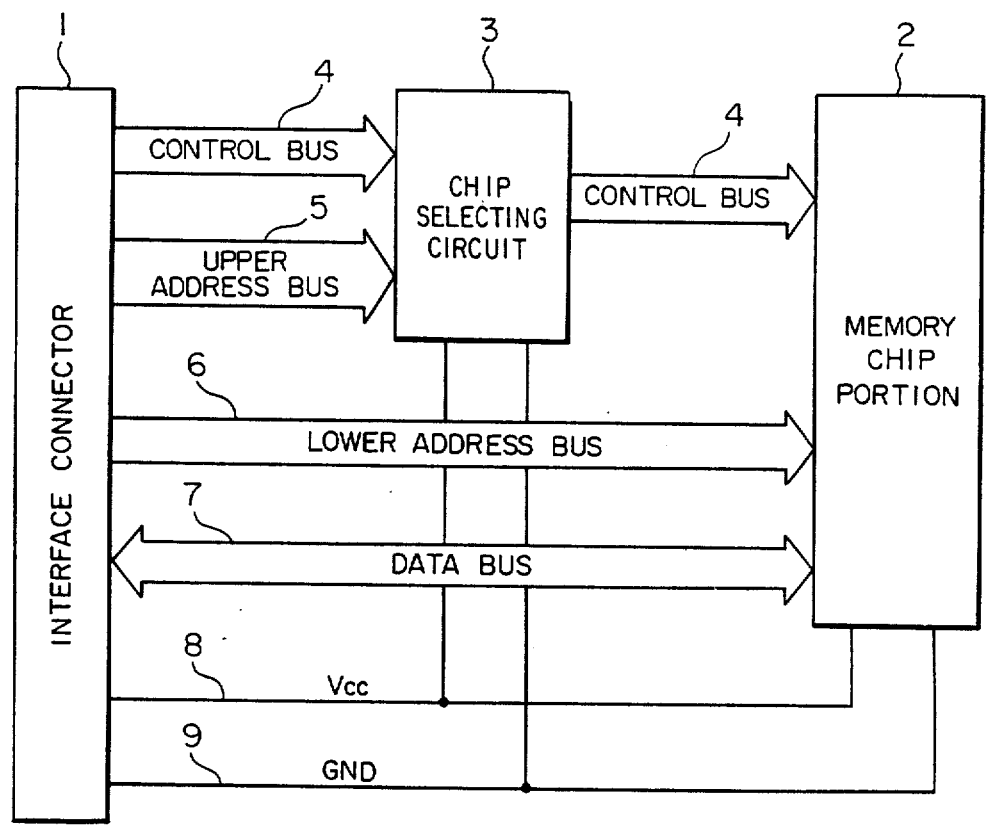
FIG. 1 is a block diagram of the internal structure of a conventional IC memory card.
Figure 2:
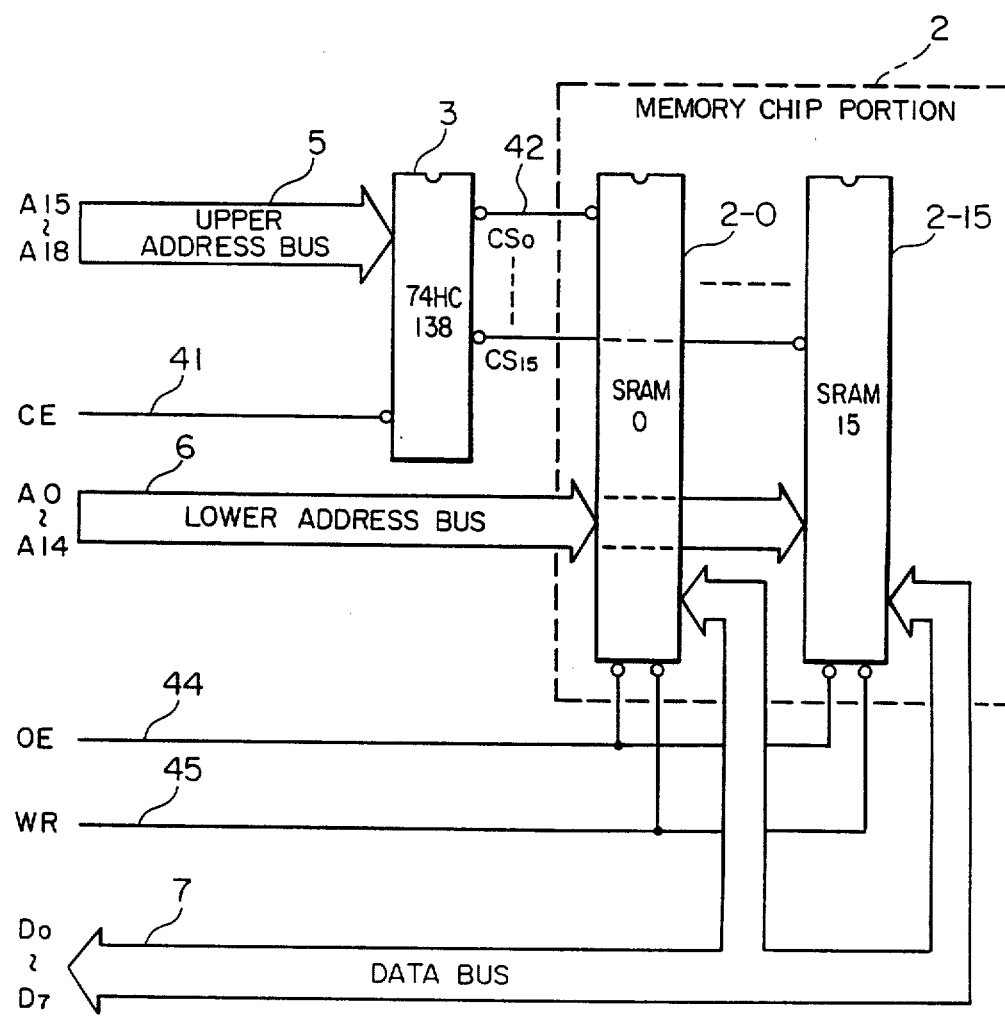
FIG. 2 is a concrete block diagram of the internal structure of the conventional IC memory card.
Figure 6:
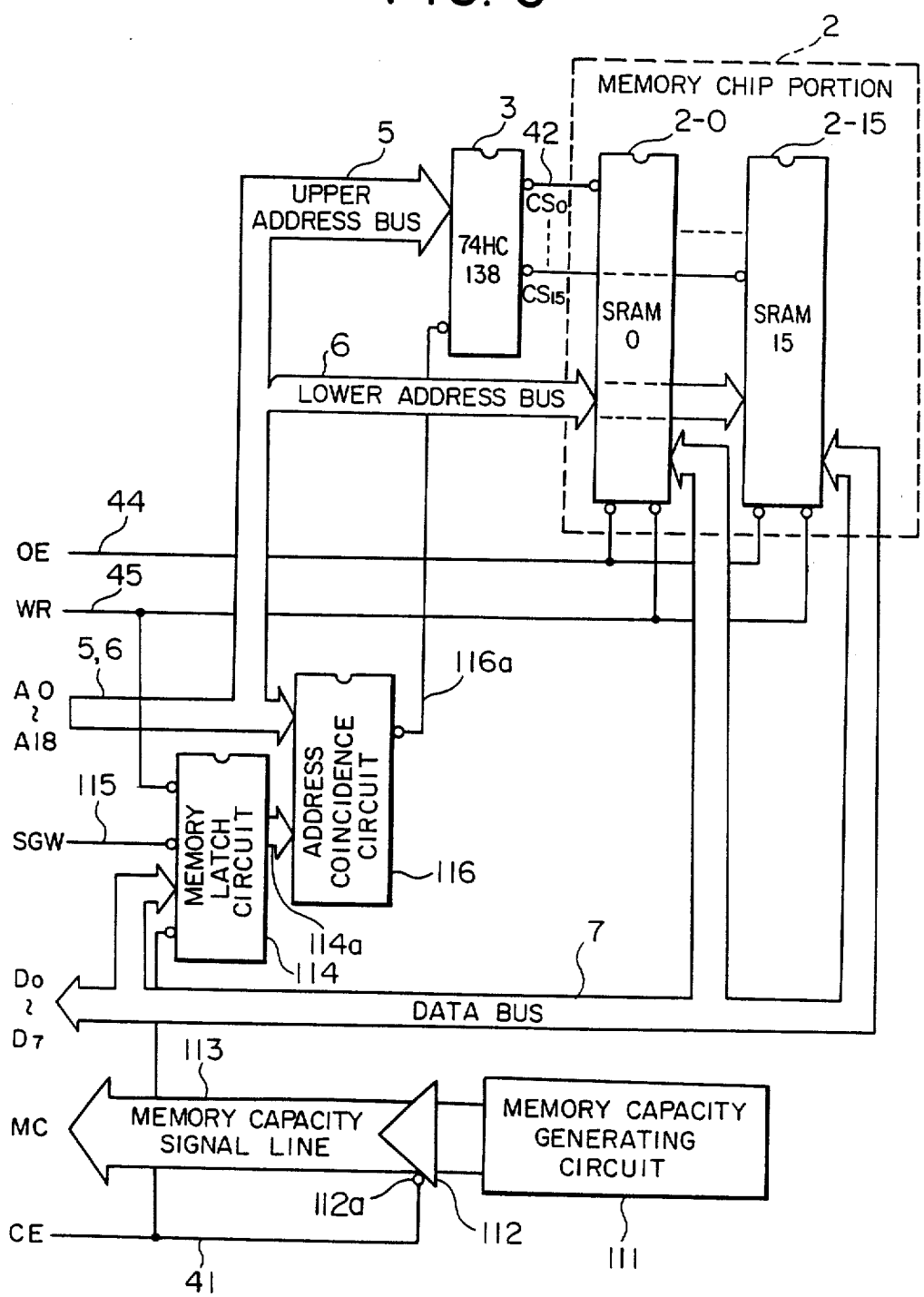
FIG. 6 is a block diagram of the internal structure of an IC memory card having an address decoding function according to the present invention.

The present invention will be described below by way of example with reference to the accompanying drawings. Reference is made first to FIG. 6 which is a block diagram of an IC memory card having an address decoding function according to the present invention. The same reference numerals designate parts which are identical to those in the IC memory card of FIG. 1. In FIG. 6, a memory capacity generating circuit 111 sends data representing the memory capacity of the memory chip portion 2 of the IC memory card to a computer system (not shown). The data are sent via a memory capacity signal line 113 when a card enable control signal 41, which is applied to an output control terminal 112a of a gate circuit 112, is in an enabling state. A memory latch circuit 114 stores a start address which is sent from the computer system. The start address is sent via the data bus 7 controlled by the write enable control signal 45 when a card enable control signal and a memory latch enable control signal are in an enabling state. The memory latch circuit 114 may be formed of a flip-flop. An address coincidence circuit 116 generates an address coincidence signal when a predetermined number of upper bits of the address data sent from the upper and lower address buses 5 and 6 are identical to the same upper bits of the address-data which are sent via a start address data line 114a from the memory latch circuit 114. The start address is loaded into the memory latch circuit 14 from the outside of the IC memory card as mentioned above, and an address coincidence signal is applied to the chip select circuit 3 via a comparator shown as an address coincidence signal line 116a. The address coincidence circuit 116 may be a program logic array (PLA). When a computer system according to the present invention maps the memory areas of the IC memory cards for each boundary of 32 K bytes on the memory map thereof, i.e., with the area of 32 K bytes, as a unit, and an address is a 19-bit address consisting of address bits A0 to A18, then the upper 4 address bits A15 to A18 are sent from the memory latch circuit 114 to the address coincidence circuit 116 via the start address data line 114a. The address coincidence circuit 116 compares the upper 4 address bits with the corresponding bits in the address which is sent from the upper and lower address buses 5 and 6. The address coincidence circuit 16 outputs an address coincidence signal 116a to the chip select circuit 3 when the upper its of the addresses are identical to each other to make the data in the IC memory card accessible from the outside of the card. This enables the memory area of the IC memory card to be mapped at any place on the memory map in the computer system for each 32 K byte boundary.

The memory latch circuit 114 and the address coincidence circuit 116 which are provided in the IC memory card function to decode an address, eliminating provision of an address decoding circuit in the computer system. Further, the card enable control line 41 of this invention is used solely or together with another control line to obtain a memory capacity data from the memory capacity generating circuit 111 and to write a start address into the memory latch circuit 114.

Figure 7:
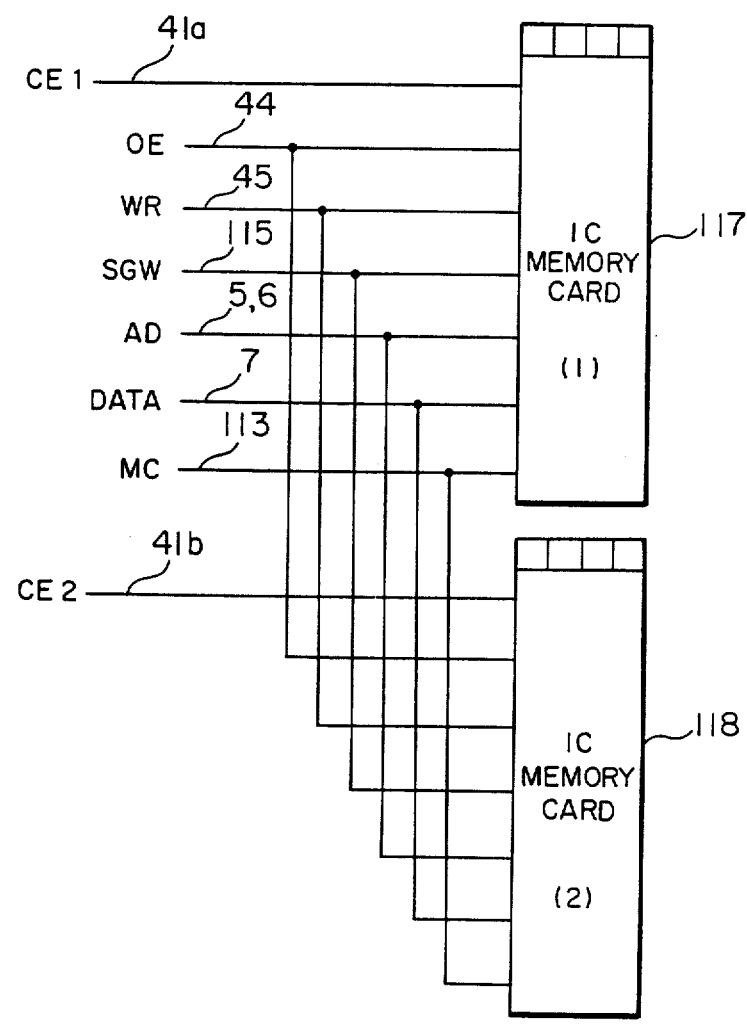
FIG. 7 is a connection diagram for showing a connection of the IC memory card of FIG. 6 to the computer system.

FIG. 7 shows how two IC memory cards according to the present invention are connected to the computer system (not shown). Two IC memory cards 117 and 118 having the structure shown in FIG. 6 are connected to the computer system via card enable control lines [CE1, CE2]41a and 41b, respectively. The IC cards 117 and 118 are connected in common to control bus lines including the output enable control line [OE] 44, the write enable control line (WR]45, the memory latch enable control line [SGW] 115, and the memory capacity signal [MC] 113, and to the upper and lower order address buses [AD] 5 and 6 and the data bus [DATA]7.

Figure 3:
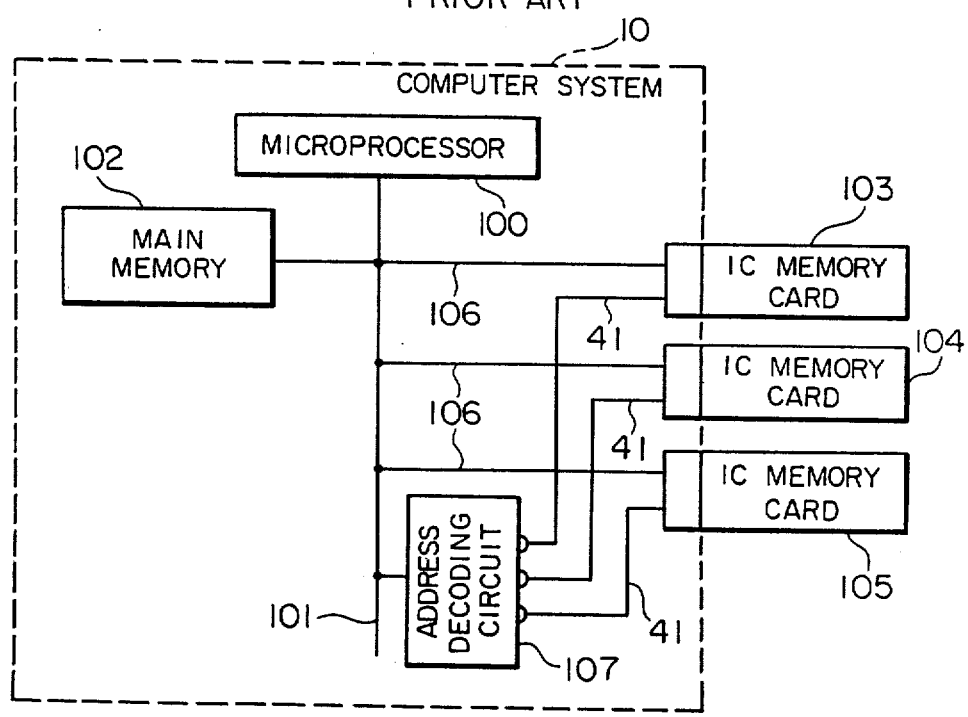
FIG. 3 is a block diagram for showing a connection between a computer system and the IC memory cards in a conventional system.
Figure 4:
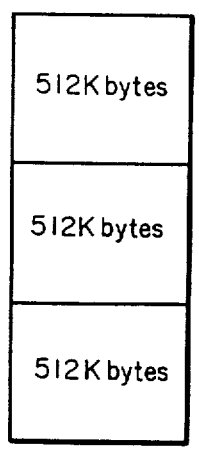
FIG. 4 shows a memory map of the conventional computer system when conventional IC memory cards having a same memory capacity are connected thereto.
Figure 5:
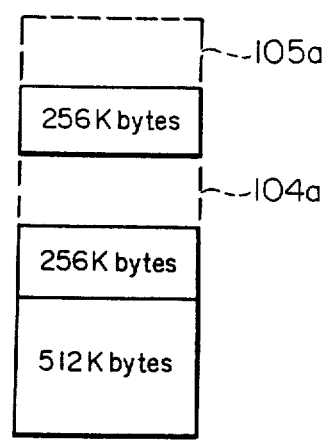
FIG. 5 shows a memory map of the conventional computer system when IC memory cards having various memory capacities are connected thereto.
Figure 8:
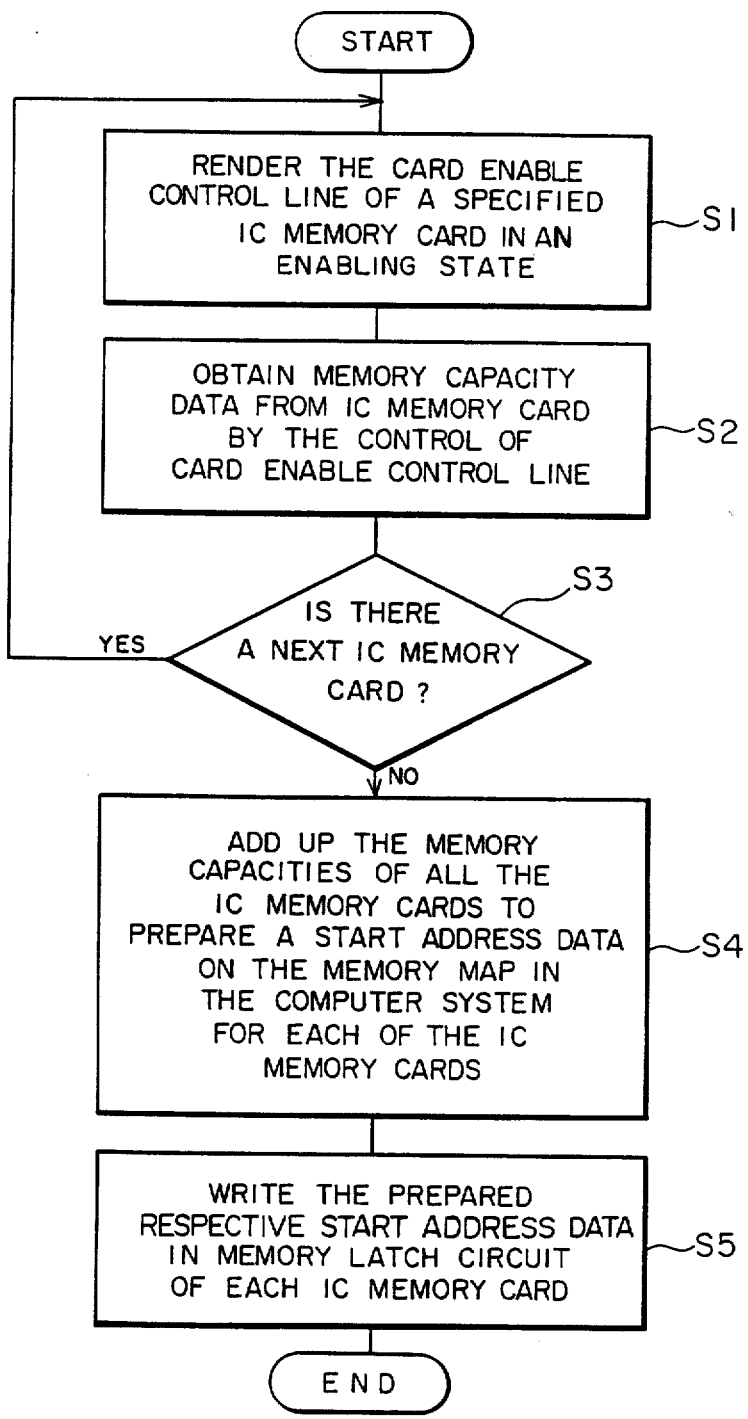
FIG. 8 is a flowchart of a process for setting respective start address data in the IC memory cards.

FIG. 8 is a flowchart of a process for loading an address into the memory latch circuit 114 of each of the IC memory cards 117 and 118 from the computer system (not shown). This process may be implemented and stored in the main memory (see FIG. 3) of the computer system as a program and may (be executed by the microprocessor. In step S1 the card, enable control line 41a of the first IC memory card which is the IC memory card 117 is placed in an enabling state, In step S2 the memory capacity data is obtained from the memory capacity generating circuit 111 of the IC memory card 117 via the memory capacity signal line 113 under the control of the gate circuit 112 (see FIG. 6) which is effected by the card enable control signal. Next, in step S3 it is determined whether a next IC memory card exists. If the IC memory card 118 exists and is connected, the process returns to step S1, and the memory capacity data of the IC memory card 118 is obtained in the same manner by placing the card enable control line 41b in an enabling state. Once the respective memory capacity information of all the IC memory cards (two in total in this embodiment) have been obtained, these capacities are added up in step S4 to prepare start addresses on the memory map in the computer system for each of the IC memory cards 117 and 118. Thereafter, in step S5 the thus-prepared start addresses are written in the memory latch circuit 114 of each of the IC memory cards 117 and 118, respectively.

Figure 9:
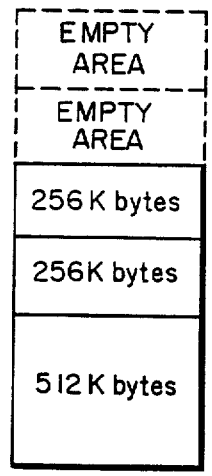
FIG. 9 shows a memory map of the computer system when IC memory cards having various memory capacities are connected thereto according to the present invention.

FIG. 9 shows a memory map made when three IC memory cards incorporating an address decoding function according to the present invention are connected to the computer system, the three IC memory cards respectively having capacities of 512 K bytes, 256 K bytes and 256 K bytes. As is apparent from FIG. 9, there are no empty, odd memory areas between the memory areas for the individual IC memory cards. In other words, the memory area of the memory map can be effectively used without intervening empty areas even when the capacities of the IC memory cards connected to the computer system are different.

In addition, the memory chip portion 2 may be a RAM or ROM memory.

Figure 10:
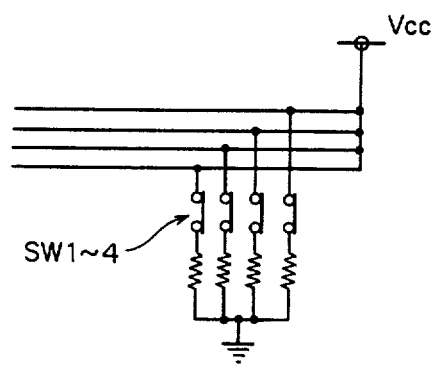
FIG. 10 is a circuit diagram for showing an example of a memory capacity generating circuit of FIG. 6.

The memory capacity generating circuit 111 for transmitting the memory capacity of an IC memory card outside of the card may be a circuit designed to generate a 4-bit signal. The circuit is, therefore, capable of outputting signals indicative of 16 types of memory capacity by combinations of opening and closing states of four switches SW-1 to SW-4, as shown in FIG. 10. Further, the means for transmitting the memory capacity data on the IC memory card may not be a special circuit- such as that employed in the above-described embodiment, which is controlled by the card enable control line 41 but may be that shown in FIG. 10. In that case, the memory capacity signal line 113 shown in FIGS. 6 and 7 must be provided for each of the IC memory cards, respectively. Alternatively, data representing the memory capacity which is written in the RAM or ROM for storing data in each of the IC memory cards beforehand may be used.

As will be understood from the foregoing description, in the IC memory card according to the present invention, the memory area of the IC memory card can be mapped from a desired start address on the memory map. In consequence, when this IC memory card is connected to a computer system as a memory, no empty, odd area is formed on the memory map in the system, utilizing the memory effectively and facilitating preparation of a memory control program.

What is claimed is:

1. An IC memory card incorporating an IC memory chip portion, comprising:
    a data bus,
    an address bus having a plurality of upper address bits,
    memory means for storing data connected to said address bus and said data bus,
    means for storing a start address received over said data bus from outside of said card and having upper bits corresponding to the upper address bit of said address bus,
    means for storing the capacity of said memory means and for transmitting signal representing the memory capacity outside of said card, and
    means connected for receiving the stored start address and for receiving from said address bus a receive address having upper bits corresponding to the upper address bits of said address bus for comparing the start address with the receive address and for making the data in said memory means accessible from outside of said card when the upper bits of the start address and the receive address are identical to each other, whereby a desired start address can be set from outside of said card.

2. An IC memory card according to claim 1 wherein:
    said means for storing a start address includes a memory latch circuit in which the start address is st from outside of said card via a card enable control line, said data bus, a write enable control line, and a latch enable control line, and
    said means for making the data in said memory means accessible from outside of said card includes an address coincidence circuit for comparing the upper bits of the start address with the upper bits of the receive address and for supplying an address coincidence signal to said memory means when these bits are identical to each other to make the data in said memory means accessible from outside of said card, whereby a desired start address can be st from outside of said card.

3. An IC memory card according to claim 2 wherein said memory means includes a plurality of memory chips having chip select inputs and a chip select circuit connected to the chip select inputs of the memory chips for selecting a chip in accordance with the receive address, said address coincidence signal being supplied to said chip select circuit.

4. An IC memory card according to claim 1 wherein said means for storing and for transmitting includes a memory capacity generating circuit for generating a signal representing the memory capacity of said memory means, and a memory capacity signal line connected to the memory capacity generating circuit for transmitting the signal representing the memory capacity outside of said card.

5. An IC memory card according to claim 1 wherein said means for storing the capacity of said memory means and for transmitting a signal representing the memory capacity includes a memory capacity generating circuit for generating a signal representing the memory capacity of said memory means and a memory capacity signal line connected to the memory capacity generating circuit to transmit the signal representing the memory capacity outside of said card.

6. An IC memory card according to claim 1 wherein said means for storing the capacity of said memory means and for transmitting a signal representing the memory capacity uses data representing the memory capacity which has been stored in said memory means.

7. An IC memory card according to claim 1, wherein said memory means includes one memory chip.

8. A computer system comprising:
    a computer system section including memory means for storing an operation system and various programs and means for performing assigned operation and read/write processing in accordance with said operation system and said various programs which are stored in said memory means; and a plurality of IC memory cards, each IC memory card comprising:

a data bus, an address bus having a plurality of upper address bits, memory means for storing data connected to said address bus and said data bus, means for storing a start address received over said data bus from outside of said card and having upper bits corresponding to the upper address bit of said address bus, means for storing the capacity of said memory means and for transmitting a signal representing the memory capacity outside of said card, and means connected to receive the stored start address and for receiving from said address bus a receive address having upper bits corresponding to the upper address bits of said address bus for comparing the start address with the receive address and for making the data in said memory means accessible from outside of said card when the upper bits of the start address and the receive address are identical to each other, whereby a desired start address can be set from outside of said card, each IC memory card being detachably connected to said computer system section as extended storage for storing data for applications, wherein said memory means of said computer system section contains a program which includes processing steps of:

(a) determining the memory capacity of each of said IC memory cards from means for transmitting a signal representing the memory capacity of the card outside of said card, said means being provided in each of said IC memory cards connected to said computer system section;

(b) adding the memory capacities and associating start addresses on a memory map in said computer system section for each of said IC memory cards, respectively, so that no empty area is generating on said memory map; and (c) writing the prepared start address in said means for storing the start address in each of said IC memory cards.

9. An IC memory card comprising:

an address bus having a plurality of upper address bits;

a memory including at least one memory device connected to said address bus, said memory having a chip select input and a predetermined memory capacity;

a memory capacity generating circuit connected to output a memory capacity output signal representing the memory capacity;

a memory latch circuit connected to receive and store a start address including upper start address bits corresponding to the upper address bits at said address bus; and a comparator connected to receive the start address stored in said memory latch circuit and an address received over said address bus, the received address having upper receive address bits received over the upper address bits of said address bus, and to output an address coincident signal when the upper start address bits and the upper receive address bits are identical, the chip select input of said memory portion being connected to go active responsive to the address coincident signal.

10. A method for allocating memory address space to a plurality of IC memory cards comprising the steps of:

arranging IC memory cards in a sequence including a first IC memory card and at least one subsequent IC memory card;

assigning a start address tot he first IC memory card;

reading a memory capacity from each of the IC memory cards; and assigning a start address to each subsequent memory card based on the sum of a start address assigned to an immediately prior IC memory card and the memory capacity read from the immediately prior IC memory card.

* * * * *

UNITED STATES PATENT AND TRADEMARK OFFICE
CERTIFICATE OF CORRECTION

PATENT NO. : 4,979,144

DATED : December 18, 1990

INVENTOR(S) : Masaharu Mizuta

It is certified that error appears in the above-identified patent and that said Letters Patent is hereby corrected as shown below:

```
Column 6, line 2, after "transmitting" insert --a--;
          line 16, change "st" to --set--;
          line 29, change "st" to --set--.

Column 7, lines 40-41, change "generating" to --generated--.

Column 8, line 33, change "tot he" to --to the--.
```

Signed and Sealed this

Thirteenth Day of October, 1992

Attest:

DOUGLAS B. COMER

*Attesting Officer*          *Acting Commissioner of Patents and Trademarks*